United States Patent
Winter et al.

(10) Patent No.: US 10,366,686 B2
(45) Date of Patent: Jul. 30, 2019

(54) TEXT-TO-SPEECH PRE-PROCESSING

(71) Applicant: GM Global Technology Operations LLC, Detroit, MI (US)

(72) Inventors: Ute Winter, Petach Tiqwa (IL); Timothy Grost, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/715,695

(22) Filed: Sep. 26, 2017

(65) Prior Publication Data

US 2019/0096387 A1    Mar. 28, 2019

(51) Int. Cl.
*G10L 13/04* (2013.01)
*G10L 13/08* (2013.01)
*G10L 15/08* (2006.01)

(52) U.S. Cl.
CPC .............. *G10L 13/04* (2013.01); *G10L 13/08* (2013.01); *G10L 15/08* (2013.01)

(58) Field of Classification Search
None
See application file for complete search history.

(56) References Cited

U.S. PATENT DOCUMENTS

| | | | | |
|---|---|---|---|---|
| 5,301,227 A * | 4/1994 | Kamei | ................. | H04M 1/271 379/355.06 |
| 6,499,011 B1 * | 12/2002 | Souvignier | ........... | G10L 15/065 704/240 |
| 7,912,702 B2 * | 3/2011 | Bennett | ................. | G06F 17/27 704/9 |
| 8,996,376 B2 * | 3/2015 | Fleizach | ................ | G10L 13/043 704/260 |
| 9,785,630 B2 * | 10/2017 | Willmore | .............. | G06F 17/276 |
| 9,997,155 B2 * | 6/2018 | Grost | .................... | G10L 15/063 |
| 10,078,631 B2 * | 9/2018 | Bellegarda | ............ | G06F 17/276 |
| 2009/0281789 A1 * | 11/2009 | Waibel | ................ | G06F 17/2735 704/3 |
| 2011/0161347 A1 * | 6/2011 | Johnston | ................. | G06F 16/84 707/769 |
| 2011/0313762 A1 * | 12/2011 | Ben-David | ............. | G10L 13/08 704/231 |
| 2017/0178625 A1 * | 6/2017 | Mamou | ................... | G10L 15/10 |

* cited by examiner

*Primary Examiner* — Neeraj Sharma
(74) *Attorney, Agent, or Firm* — Cantor Colburn LLP

(57) ABSTRACT

Examples of techniques text-to-speech pre-processing for speech recognition and speech synthesis are disclosed. In one example implementation, a computer-implemented method includes receiving, by a processing device, an automated speech recognition output comprising an n-best list and associated confidence scores. The method further includes performing, by the processing device, a TTS pre-processing on the n-best list and associated confidence scores to generate a read back message, wherein the read back message comprises a read back instruction. The method further includes sending, by the processing device, the read back message to a TTS speech synthesizer for generating an audible signal based on the read back message to cause an audio device to present the read back message.

15 Claims, 4 Drawing Sheets

TEXT-TO-SPEECH PRE-PROCESSING

INTRODUCTION

The present disclosure relates generally to speech recognition and speech synthesis and more particularly to text-to-speech (TTS) pre-processing for speech recognition and speech synthesis.

Speech recognition (or "automated speech recognition" (ASR)) enables computing devices to recognize spoken language and translate the spoken language into text or intentions. ASR enabled computing devices can receive spoken language input from a user and translate the spoken language input into text that the computing device can understand. This enables, for example, the computing device to implement an action when it receives a spoken language input. For example, if a user says "call home," a computing device enabled with ASR may recognize and translate the phrase and initiate a call.

Speech synthesis enables computing devices to "speak" text through an audio output (e.g., speakers, headphones, etc.) to a user. For example, if a user receives an electronic message on a speech synthesis-enabled computing device, the computing device could "speak" the message to the user via an audio output of the computing device so the user can hear, instead of read, the message.

SUMMARY

In one exemplary embodiment, a computer-implemented method for text-to-speech (TTS) pre-processing includes receiving, by a processing device, an automated speech recognition output comprising an n-best list and associated confidence scores. The method further includes performing, by the processing device, a TTS pre-processing on the n-best list and associated confidence scores to generate a read back message, wherein the read back message comprises a read back instruction. The method further includes sending, by the processing device, the read back message to a TTS speech synthesizer for generating an audible signal based on the read back message to cause an audio device to present the read back message.

In some examples, the read back instruction comprises a pause instruction. In some examples, the read back instruction comprises an enunciation instruction. In some examples, the read back instruction comprises an intonation instruction. In some examples, the read back instruction comprises a volume instruction. In some examples, performing the TTS pre-processing further comprises aligning n-best list items on the n-best list. In some examples, performing the TTS pre-processing further comprises parsing the n-best list items. In some examples, performing the TTS pre-processing further comprises identifying strong words and weak words using the associated confidence scores, a user model, a context model, parsing results from parsing the n-best list items, and an n-best list alignment including repetitions across the n-best list items. In some examples, performing the TTS pre-processing further comprises comparing a user pronunciation to a default pronunciation and detecting and marking mismatches. In some examples, performing the TTS pre-processing further comprises altering and adapting the audible output by adding intonation information, pause information, volume information, and enunciation information to the read back message and switching words within the read back message to user pronunciation if a mismatch is marked. According to some examples, the method further includes enabling, by the processing device, a user to alter a word or a phrase in the audible output while the audio device presents the audible output.

In another exemplary embodiment, a system for text-to-speech (TTS) pre-processing includes a memory including computer readable instructions and a processing device for executing the computer readable instructions for performing a method. In examples, the method includes receiving, by a processing device, an automated speech recognition output comprising an n-best list and associated confidence scores. The method further includes performing, by the processing device, a TTS pre-processing on the n-best list and associated confidence scores to generate a read back message, wherein the read back message comprises a read back instruction. The method further includes sending, by the processing device, the read back message to a TTS speech synthesizer for generating an audible signal based on the read back message to cause an audio device to present the read back message.

In some examples, the read back instruction comprises a pause instruction. In some examples, the read back instruction comprises an enunciation instruction. In some examples, the read back instruction comprises an intonation instruction. In some examples, the read back instruction comprises a volume instruction. In some examples, performing the TTS pre-processing further comprises: aligning n-best list items on the n-best list; parsing the n-best list items; identifying strong words and weak words using the associated confidence scores, a user model, a context model; parsing results from parsing the n-best list items, and an n-best list alignment including repetitions across the n-best list items; comparing a user pronunciation to a default pronunciation and detecting and marking mismatches; and altering and adapting the audible output by adding intonation information, pause information, volume information, and enunciation information to the read back message and switching words within the read back message to user pronunciation if a mismatch is marked.

In yet another exemplary embodiment a computer program product for text-to-speech (TTS) pre-processing includes a computer readable storage medium having program instructions embodied therewith, wherein the computer readable storage medium is not a transitory signal per se, the program instructions executable by a processing device to cause the processing device to perform a method. In examples, the method includes receiving, by a processing device, an automated speech recognition output comprising an n-best list and associated confidence scores. The method further includes performing, by the processing device, a TTS pre-processing on the n-best list and associated confidence scores to generate a read back message, wherein the read back message comprises a read back instruction. The method further includes sending, by the processing device, the read back message to a TTS speech synthesizer for generating an audible signal based on the read back message to cause an audio device to present the read back message.

In some examples, the read back instruction comprises a pause instruction, an enunciation instruction, an intonation instruction, and a volume instruction.

BRIEF DESCRIPTION OF THE DRAWINGS

Other features, advantages, and details appear, by way of example only, in the following detailed description, the detailed description referring to the drawings in which.

Figure 1:
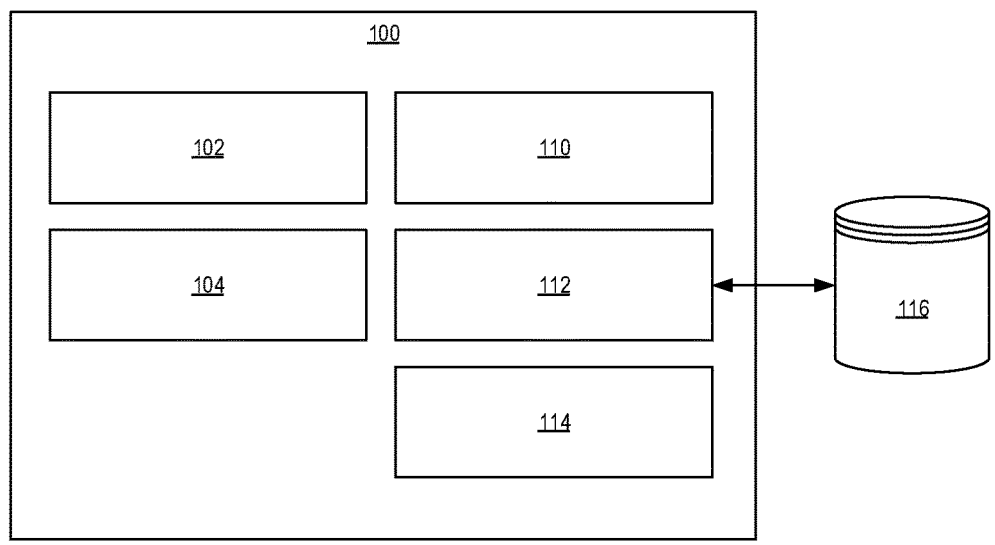
FIG. 1 depicts a processing system for TTS pre-processing for speech recognition and speech synthesis, according to aspects of the present disclosure.

The above features and advantages, and other features and advantages of the disclosure are readily apparent from the following detailed description when taken in connection with the accompanying drawings.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for to text-to-speech (TTS) pre-processing for speech recognition and speech synthesis. In particular, TTS pre-processing analyzes textual results from a speech dictation engine and/or text and provides instructions to a TTS speech synthesizer to improve TTS translation. For example, the present techniques analyze differences (e.g., which words sound different, intonation, pronunciation, pace, which words sound different, etc.) to provide more accurate read back of messages.

According to an example of the present disclosure, a first user may receive an incoming message (e.g., an e-mail message, a text message, etc.) from a second user. If the first user is unable to type a response to the incoming message (e.g., the user is driving a vehicle, the user is cooking, etc.) but still wishes to respond, the first user can use voice-to-text features of computing devices to respond to the message by speaking a reply. Traditionally, an automated speech recognition module receives the spoken message and converts it to text. The text can be sent and/or can be read back to the first user for the first user to confirm or correct the message prior to sending the response.

Usability studies have identified various limitations to existing speech synthesis systems. For example, read back can sound flat and without pauses, recognition errors cannot be heard, the volume is not high enough in a noisy environment (e.g., in a vehicle), the read back cannot be supported visually while the user is driving, cognitive demand on the user is high, and the like. The present techniques can improve existing speech synthesis by pre-processing text before the speech synthesis occurs. For example, existing speech synthesis systems may output "Did you have a chance to review the article I sent to you it's pretty sad isn't it" whereas the present techniques instead enable a more accurate "Did you have a chance to review the article, I sent to you. It's pretty sad. Isn't it." In another example, existing speech synthesis systems may output "Ute will be here for Thanksgiving I'm mourning if you and the family can join us" whereas the present techniques instead enable a more accurate "Ute will be here for Thanksgiving. I'm mourning, if you and the family can join us."

ASR systems, which translate a spoken utterance into text, are usually referred to as dictation engines. The present techniques read the dictated text back to the user before processing further (such as sending the message to a contact). Some ASR systems, in particular, older ones, transfer the user utterance directly into a user intent, which leads to a system action (e.g., "Call Contact: John Smith, mobile phone number") regardless of the words that the user has spoken.

The present techniques can pre-process recognized text before TTS playback. The present techniques can also identify likely problematic areas in text such as low confidence, homonyms, similar sounding results, proper names, pronunciation/intonation discrepancy, and the like. Moreover, the present techniques can use history and context to replace or choose words according to typical user style elements, user preferred vocabulary, and/or context vocabulary.

Example embodiments of the disclosure include or yield various technical features, technical effects, and/or improvements to technology. Example embodiments of the disclosure provide for text-to-speech (TTS) pre-processing to more quickly and accurately convert text to speech. More particularly, the embodiments described herein improve existing TTS systems by pre-processing text using n-best list items and scores to add intonation, pause, and enunciation information and/or to replace mispronounced words in message read back. These aspects of the disclosure constitute technical features that yield the technical effect of reducing the overall computational load on traditional TTS systems while increasing the accuracy and usability of the TTS output (i.e., read back). Accordingly, the present techniques improve the functioning of processing systems used to perform text-to-speech analysis. As a result of these technical features and technical effects, the techniques described herein represent an improvement to existing TTS techniques. It should be appreciated that the above examples of technical features, technical effects, and improvements to technology of example embodiments of the disclosure are merely illustrative and not exhaustive.

Figure 2:
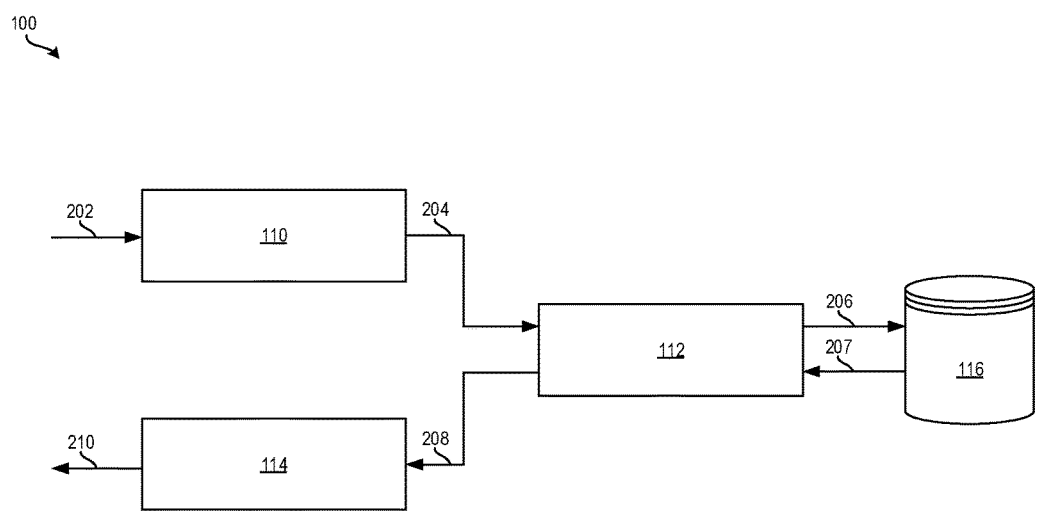
FIG. 2 depicts a processing system for TTS pre-processing for speech recognition and speech synthesis, according to aspects of the present disclosure.

FIGS. 1 and 2 depict a processing system 100 for TTS pre-processing for speech recognition and speech synthesis, according to aspects of the present disclosure. The processing system 100 includes a processing device 102, a memory 104, an ASR engine 110, a TTS pre-processing engine 112, and a TTS speech synthesizer engine 114.

The various components, modules, engines, etc. described regarding FIG. 1 (and FIG. 2 described herein) can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these.

In examples, the engine(s) described herein can be a combination of hardware and programming. The programming can be processor executable instructions stored on a tangible memory, and the hardware can include the processing device 102 for executing those instructions. Thus a system memory (e.g., the memory 104) can store program instructions that when executed by the processing device 102 implement the engines described herein. Other engines can also be utilized to include other features and functionality described in other examples herein. Alternatively or additionally, the processing system 100 can include dedicated hardware, such as one or more integrated circuits, ASICs, application specific special processors (ASSPs), field programmable gate arrays (FPGAs), or any combination of the foregoing examples of dedicated hardware, for performing the techniques described herein.

The ASR engine 110 receives an input message 202, which may be an audible input from a user. The ASR engine 110 analyzes the input message 202 and determines n-best dictation results ("n-best list") and associated confidence scores based on the whole input message 202 and the individual words and/or phrases within the input message 202. The n-best list is a list of possible results of the ASR based on the input message. Each item in the list can be a different dictation result and can include a confidence score that indicates how confident the ASR engine 110 is in the dictation and/or how likely the dictation result is to be accurate. The output 204 of the ASR engine (i.e., the input message 202 along with the n-best dictation results and associated confidence scores) is received at the TTS pre-processing engine 112.

The TTS pre-processing engine 112 receives the output 204 of the ASR engine 110 and performs pre-processing on the received output 204. For example, the pre-processing engine 112 aligns n-best list items. The TTS pre-processing engine 112 then parses n-best items in comparison, for example, based on grammar/semantics, user self-repair, sentence structure, etc. The TTS pre-processing engine 112 then identifies strong/weak words or phrases, for example, based on confidence score, user and context models stored in the model database 116, parsing results, and repetitions/variations across n-best items, etc.

The TTS pre-processing engine 112 can access the model database 116 to receive models (e.g., a user model, a context model, etc.) to identify strong/weak words or to replace words by more likely words from the user/context model. For example, the TTS pre-processing engine 112 can query 206 the model database 116 and can receive 207 models from the model database 116. An example of a user model can contain proper names, favorite places user-specific vocabulary and the like. An example of a context model can contain text or query history information, location context information, date/time context information, and the like. For example, a proper name "Ute" can be stored in the user model, and a context date of "Thanksgiving" being near in time can be stored in the context model.

The TTS pre-processing engine 112 compares user pronunciation to default TTS pronunciation and marks mismatches. If a mismatch is detected, the user's pronunciation can be accepted as correct according to aspects of the present disclosure. The TTS pre-processing engine 112 then prepares for read back by adding intonation and pause times for sentence structure, switches words to user pronunciation (e.g., if a mismatch is detected), marks words for enunciation and slower read back, and adjusts read back volume to detected noise level of the environment. The noise level can be detected, for example, through an in-vehicle microphone(s) in the case where the TTS pre-processing occurs in a vehicle. The microphone(s) can detect other noise (e.g., music playing, people talking, road noise, etc.) and can adjust the volume accordingly. In another example, a signal-to-noise ratio (SRN) can be determined and used by the ASR engine 110 to adjust volume according to the SRN value.

A pre-processed output 208 of the TTS pre-processing engine 112 with the message read back and accompanying instructions (e.g., intonation, pauses, enunciation, volume, etc.) is transmitted to the TTS speech synthesizer engine 114, which converts the pre-processed output 208 into an audible output 210 to provide the read back to a user. The audible output 210 can be output by an audio device, such as a speaker, to enable a user to listen to the message. The audible output 210 is output by the TTS speech synthesizer according to the pre-processing performed by the TTS pre-processing engine 112 to present the message to the user. According to aspects of the present disclosure, the audible output 210 can be read back to the user prior to the message being sent (e.g., a text message, an email message, etc.) to enable the user to hear and/or confirm the audible output 210.

The following describes an example of TTS pre-processing based on the following input message 202: "We are Pat and I will be there at 8:30." This input message 202 is responsive to the hypothetical incoming message: "Are we still up for tonight at Cinnabon?" For example, a user may receive a text message containing the hypothetical incoming message, and the user wants to respond but cannot because the user is driving or otherwise unable to type the response. In such cases, the user speaks the input message 202, such as into a microphone.

The ASR engine 110 then analyzes the input message 202 and determines n-best dictation results and associated confidence scores of the input message 202. An example of n-best list are: 1) "We are at and I will be there at 830" and 2) "We are pet and eye will be there at 830" etc. The TTS pre-processing engine 112 receives the message and n-best list and performs pre-processing. For example, the TTS pre-processing engine 112 aligns n-best list times and then parses the n-best list items in comparison based on grammar/semantics, user self-repair, sentence structure, and the like. The TTS pre-processing engine 112 identifies strong and weak words using confidence scores (e.g., "at an eye," "their pet," "830," etc.), user and context models such as from the model database 116 (name "pet"→"Pat," meeting schedule "their"→"their," time "830"→"8:30," etc.), parsing results (e.g., sentence structure "pet an eye"→"Pat and I"), and repetitions/variance across n-best items ("their"→"there," "an eye"→"and I," etc.). The user model can contain a list of names of friends of the user (e.g., "Pat"), favorite locations (e.g., "Cinnabon"), and context information (e.g., meeting schedules). Each of these can be used to identify strong/weak words. Topic mapping algorithms can be used for natural language processing (NLP) and can include neural networks for NLP. Phonetic similarity can be determined by alignment with score comparisons (e.g., edit distance, etc.).

The TTS pre-processing engine 112 also compares user pronunciation to default TTS pronunciation and marks mismatches, then prepares for read back by adding intonation and pause information for sentence structure, switching words to user pronunciation if matches are detected, and/or marking words for enunciation and slower read back. In this example, the pre-processed output 208 is as follows: "We are {↓200} Pat and I will be there at 8:30 {↓}." For example, the ↑ symbol denotes an increase in intonation, the → symbol denotes a flat intonation, and the ↓ symbol denotes a decrease in intonation. The numeric values represent pauses. For example, 200 can indicate a pause of 200 milliseconds, and 50 can indicate a 50 millisecond pause. Bold text represents text to be read back with more enunciation (e.g., to make sure the word is pronounced clearly). Other intonation, enunciation, and/or pauses can be implemented according to aspects of the present disclosure.

The following describes another example of TTS pre-processing based on the following input message 202: "Ute will be here for Thanksgiving I'm wondering if you and the family can join us." The input message 202 is spoken, for example, into a microphone of the processing system 200 and the ASR engine receives the input message 202. The ASR engine then analyzes the input message 202 and determines n-best dictation results and associated confidence scores based on the whole input message 202 and the individual words and/or phrase within the input message 202. The output 204 of the ASR engine is as follows according to this example: "Ute will be here for Thanksgiving I'm mourning if you and the family can join us." The TTS pre-processing engine 112 performs TTS pre-processing on the output 204 to generate the pre-processed output 208 as follows: "Ute will be here for Thanksgiving {↑200} I'm mourning {→50} if you and the family can join us {↓}." The braces contain indication of pauses, enunciation, and intonation that can be used by the TTS speech synthesizer engine 114 when reading back the message.

The processing system 100 can pre-process recognized text before TTS playback. For example, the processing system 100 can split text into sentences or units, add syntactic/semantic parsing to decide between words and phrases, remove or fix user self-repairs (e.g., stutter, repetition, verbal pauses, filler phrases, etc.) or other artifacts, and identify mismatches in user versus system pronunciation/intonation of words (e.g., proper names, nicknames, business names, etc.). Accordingly, read back can more accurately provide the intended text, natural pause times, and natural/expressive intonation.

The processing system 100 can also identify likely problematic areas in text such as low confidence, homonyms, similar sounding results, proper names, pronunciation/intonation discrepancy, and the like. For example, the processing system 100 can play back words with more enunciation and at a slower rate, mirror user pronunciation/intonation for identified mismatches, can complement read back by presenting text on a display (e.g., if a user is driving), allow a user to interfere at certain phrases or words (e.g., to make a correction), and include interaction sequences to listen again to or to correct words and phrases. Read back of specific words is easier to understand and easier to determine whether the recognition was correct.

Moreover, the processing system 100 can use history and context to replace or choose words according to typical user style elements, user preferred vocabulary, and/or context vocabulary. For example, the processing system 100 can use abbreviations, acronyms, non-standard spelling or dictation, user formality level, proper names, nicknames, preferred places, business names, frequently used words or phrases, likely vocabulary based on previous messages/text, typical or historical destinations based on user GPS data or favorites, dates and times, locations that fit current context, and the like to replace or choose words. Replacement or choice of specific words improves recognition, and read back is more accurate and easier to understand.

Figure 3:
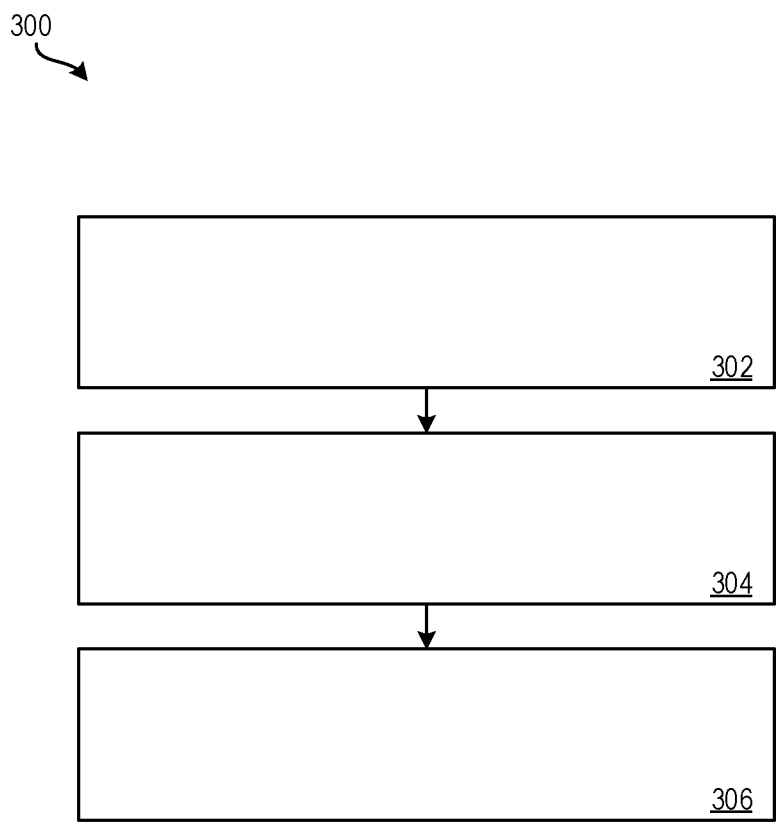
FIG. 3 depicts a flow diagram of a method for TTS pre-processing for speech recognition and speech synthesis, according to aspects of the present disclosure.

FIG. 3 depicts a flow diagram of a method 300 for text-to-speech (TTS) pre-processing, according to aspects of the present disclosure. The method 300 can be implemented, for example, by the processing system 100 of FIGS. 1 and 2, by the processing system 400 of FIG. 4, or by another suitable processing system or device.

The ASR engine 110 of the processing system 100 performs a dictation analysis on an input message to generate an n-best list and associated confidence scores for the input message. At block 302, the TTS pre-processing engine 112 then receives an automated speech recognition output from the ASR engine 110 comprising an n-best list and associated confidence scores. At block 304, the TTS pre-processing engine 112 of the processing system 100 performs TTS pre-processing on the n-best list and associated confidence scores to generate a read back message, wherein the read back message comprises a read back instruction. Read back information can include, for example, a pause instruction, an enunciation instruction, a volume instruction, and/or an intonation instruction.

According to aspects of the present disclosure, performing the TTS pre-processing further includes aligning n-best list items on the n-best list and/or parsing the n-best list items. Performing the TTS pre-processing can further include identifying strong words and weak words using the associated confidence scores, a user model, a context model, parsing results from parsing the n-best list items, and repetitions across the n-best list items. A user pronunciation can be compared to a default pronunciation and to detect and mark mismatches. Performing the TTS pre-processing can also include generating the audible output by adding intonation information, pause information, and enunciation information to the read back message and switching words within the read back message to user pronunciation if a mismatch is marked.

At block 306, read back message is sent to the TTS speech synthesizer engine 114 of the processing system 100, which performs TTS speech synthesis on the read back message to generate an audible output (i.e., to cause the read back message to be presented). For example, the processing system 100 generates an audible signal based on the audible output to cause an audio device (e.g., the speaker 431 of the processing system 400 of FIG. 4) to present the audible output, such as to the user.

Additional processes also can be included. For example, the method 300 can include receiving, by the processing device, a confirmation from a user to send an electronic message subsequent to the audio device presenting the audible output. The method 300 can further include sending the electronic message based at least in part on receiving the confirmation. This enables a user to vary a message before it is sent. According to aspects of the present disclosure, the user can edit the message before it is sent, such as by manually typing corrections, by speaking corrections, by selecting corrections from a list, etc. It should be understood that the processes depicted in FIG. 3 represent illustrations and that other processes can be added or existing processes can be removed, modified, or rearranged without departing from the scope and spirit of the present disclosure.

Figure 4:
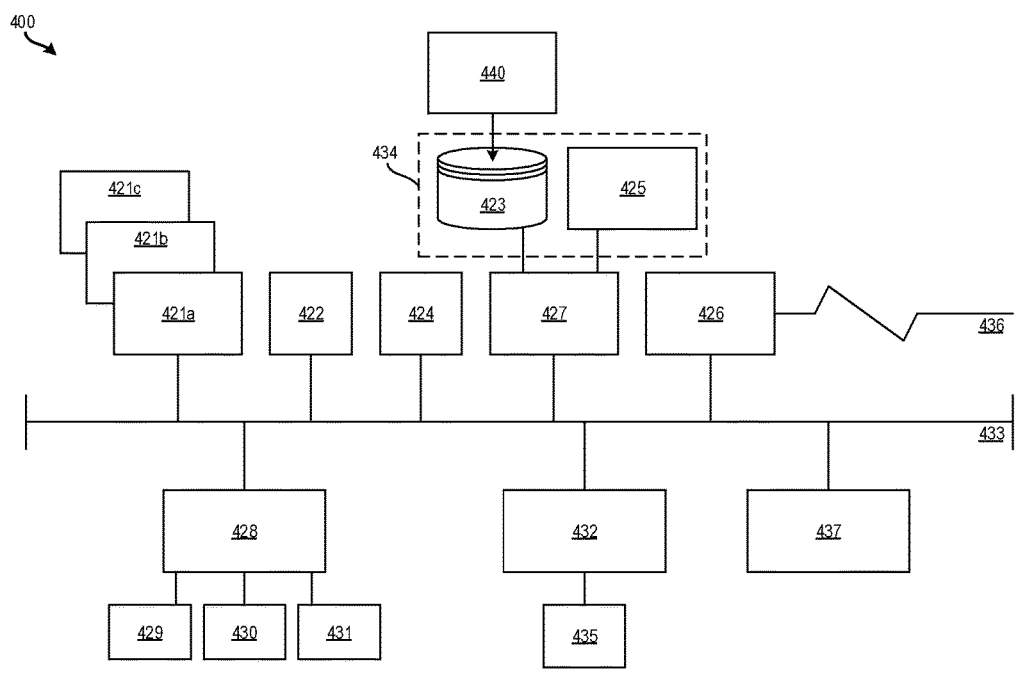
FIG. 4 depicts a block diagram of a processing system for implementing the techniques described herein, according to aspects of the present disclosure.

For example, FIG. 4 illustrates a block diagram of a processing system 400 for implementing the techniques described herein. In examples, processing system 400 has one or more central processing units (processors) 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and can include a basic input/output system (BIOS), which controls certain basic functions of processing system 400.

Further illustrated are an input/output (I/O) adapter 427 and a network adapter 426 coupled to system bus 433. I/O adapter 427 can be a small computer system interface (SCSI) adapter that communicates with a hard disk 423 and/or other storage drive 425 or any other similar component. I/O adapter 427, hard disk 423, and storage device 425 are collectively referred to herein as mass storage 434. Operating system 440 for execution on processing system 400 can be stored in mass storage 434. A network adapter 426 interconnects system bus 433 with an outside network 436 enabling processing system 400 to communicate with other such systems.

A display (e.g., a display monitor) 435 is connected to system bus 433 by display adaptor 432, which can include a graphics adapter to improve the performance of graphics and general computation intensive applications and a video controller. In one aspect of the present disclosure, adapters 426, 427, and/or 432 can be connected to one or more I/O buses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 can be interconnected to system bus 433 via user interface adapter 428, which can include, for example, a Super I/O chip integrating multiple device adapters into a single integrated circuit.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store an operating system to coordinate the functions of the various components shown in processing system 400.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes can be made and equivalents can be substituted for elements thereof without departing from its scope. In addition, many modifications can be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for text-to-speech (TTS) pre-processing, the method comprising:
   receiving, by a processing device, an automated speech recognition output comprising an n-best list and associated confidence scores;
   receiving, by the processing device, a user model from a model database, the user model containing proper names, favorite places, and user-specified vocabulary;
   receiving, by the processing device, a context model from the model database, the context model containing text or query history information, location context information, and date and time context information;
   performing, by the processing device, a TTS pre-processing on the n-best list and associated confidence scores to generate a read back message, wherein the read back message comprises a read back instruction, wherein performing the TTS pre-processing further comprises aligning n-best list items on the n-best list, parsing the n-best list items, and identifying strong words and weak words using the associated confidence scores, the user model, the context model, parsing results from parsing the n-best list items, and an n-best list alignment including repetitions across the n-best list items; and
   sending, by the processing device, the read back message to a TTS speech synthesizer for generating an audible signal based on the read back message to cause an audio device to present the read back message.

2. The computer-implemented method of claim 1, wherein the read back instruction comprises a pause instruction.

3. The computer-implemented method of claim 1, wherein the read back instruction comprises an enunciation instruction.

4. The computer-implemented method of claim 1, wherein the read back instruction comprises an intonation instruction.

5. The computer-implemented method of claim 1, wherein the read back instruction comprises a volume instruction.

6. The computer-implemented method of claim 1, wherein performing the TTS pre-processing further comprises comparing a user pronunciation to a default pronunciation and detecting and marking mismatches.

7. The computer-implemented method of claim 6, wherein performing the TTS pre-processing further comprises altering and adapting the read back message by adding intonation information, pause information, volume information, and enunciation information to the read back message and switching words within the read back message to user pronunciation if a mismatch is marked.

8. The computer-implemented method of claim 1, further comprising:
   enabling, by the processing device, a user to alter a word or a phrase in the read back message while the audio device presents the read back message.

9. A system for text-to-speech (TTS) pre-processing, the system comprising:
   a memory comprising computer readable instructions; and
   a processing device for executing the computer readable instructions for performing a method, the method comprising:

receiving, by the processing device, an automated speech recognition output comprising an n-best list and associated confidence scores;

receiving, by the processing device, a user model from a model database, the user model containing proper names, favorite places, and user-specified vocabulary;

receiving, by the processing device, a context model from the model database, the context model containing text or query history information, location context information, and date and time context information;

performing, by the processing device, the TTS pre-processing on the n-best list and associated confidence scores to generate a read back message, wherein the read back message comprises a read back instruction, wherein performing the TTS pre-processing further comprises aligning n-best list items on the n-best list, parsing the n-best list items, and identifying strong words and weak words using the associated confidence scores, the user model, the context model, parsing results from parsing the n-best list items, and an n-best list alignment including repetitions across the n-best list item; and sending, by the processing device, the read back message to a TTS speech synthesizer for generating an audible signal based on the read back message to cause an audio device to present the read back message.

10. The system of claim 9, wherein the read back instruction comprises a pause instruction indicating a length of time of a pause.

11. The system of claim 9, wherein the read back instruction comprises an enunciation instruction presented as bold text that represents text to be read back with more enunciation than non-bold text.

12. The system of claim 9, wherein the read back instruction comprises an intonation instruction as a visual indicator, the visual indicator being one of an up arrow or a down arrow, wherein the up arrow denotes an increase in intonation, and wherein the down arrow denotes a decrease in intonation.

13. The system of claim 9, wherein the read back instruction comprises a volume instruction.

14. The system of claim 9, wherein performing the TTS pre-processing further comprises:

aligning n-best list items on the n-best list;

parsing the n-best list items; identifying strong words and weak words using the associated confidence scores, a user model, a context model; parsing results from parsing the n-best list items, and an n-best list alignment including repetitions across the n-best list items;

comparing a user pronunciation to a default pronunciation and detecting and marking mismatches; and altering and adapting the read back message by adding intonation information, pause information, volume information, and enunciation information to the read back message and switching words within the read back message to user pronunciation if a mismatch is marked.

15. A computer program product for text-to-speech (TTS) pre-processing, the computer program product comprising:

a computer readable storage medium having program instructions embodied therewith, wherein the computer readable storage medium is not a transitory signal per se, the program instructions executable by a processing device to cause the processing device to perform a method comprising:

receiving, by the processing device, an automated speech recognition output comprising an n-best list and associated confidence scores;

performing, by the processing device, the TTS pre-processing on the n-best list and associated confidence scores to generate a read back message, wherein the read back message comprises a read back instruction; and sending, by the processing device, the read back message to a TTS speech synthesizer for generating an audible signal based on the read back message to cause an audio device to present the read back message, wherein the read back instruction comprises a pause instruction indicating a length of time of a pause, an enunciation instruction presented as bold text that represents text to be read back with more enunciation than non-bold text, an intonation instruction as a visual indicator, the visual indicator being one of an up arrow or a down arrow, wherein the up arrow denotes an increase in intonation, and wherein the down arrow denotes a decrease in intonation, and a volume instruction, the volume instruction indicating a volume level based on a noise level detected via a microphone in a vehicle, and wherein the volume level is adjusted based on a signal-to-noise ratio.

* * * * *